(12) United States Patent
Wang et al.

(10) Patent No.: US 6,709,144 B2
(45) Date of Patent: Mar. 23, 2004

(54) TOP LIGHT SOURCE DEVICE

(75) Inventors: Ying-Fu Wang, Taipei (TW); Jung-Chih Tsai, Yuan Lin Hsien (TW)

(73) Assignee: Taiwan Nano Electro-Optical Technology Co., Ltd., Taoyuan (TW)

( * ) Notice: Subject to any disclaimer, the term of this patent is extended or adjusted under 35 U.S.C. 154(b) by 117 days.

(21) Appl. No.: 10/014,482

(22) Filed: Dec. 14, 2001

(65) Prior Publication Data

US 2002/0075426 A1 Jun. 20, 2002

(30) Foreign Application Priority Data

Dec. 19, 2000 (TW) ........................................ 89127287 A

(51) Int. Cl.[7] ................................................ F21V 7/04
(52) U.S. Cl. ........................ 362/561; 362/558; 362/555; 349/65
(58) Field of Search ......................... 362/31, 558, 330, 362/555, 561, 551; 349/64, 65

(56) References Cited

U.S. PATENT DOCUMENTS 5,377,084 A * 12/1994 Kojima et al. ............... 362/31
5,590,945 A * 1/1997 Simms ......................... 362/31
5,618,096 A * 4/1997 Parker et al. ................. 362/31
6,347,873 B1 * 2/2002 Hosseini et al. ............. 362/31
6,412,969 B1 * 7/2002 Torihara et al. ............. 362/31

* cited by examiner

*Primary Examiner*—Sandra O'Shea
*Assistant Examiner*—Ali Alavi
(74) *Attorney, Agent, or Firm*—Troxell Law Office PLLC

(57) ABSTRACT

This invention provides a backlight device which includes at least: a photo conductive plate used for visible light to go through; a point light source, which is beside the photo conductive plate, used for producing visible light; a first diffusing top, which is beside the photo conductive plate, used for diffusing the visible light from the point light source to the lighting method of uniform line light source; a second diffusing top, which is on the bottom of the photo conductive plate, used for diffusing the visible light from the first diffusing top to the lighting method of uniform top light source; a diffusing reflect objective, which is below the photo conductive plate, used for diffusing the light and then reflecting the diffused light to the photo conductive plate.

15 Claims, 1 Drawing Sheet

TOP LIGHT SOURCE DEVICE

FIELD OF THE INVENTION

The present invention relates to a photo conductive device, more specifically, the present invention relates to a photo conductive device of low exhausting power's point light source which can produce top light source of uniform brightness.

DESCRIPTION OF THE PRIOR ART

Ever since liquid crystal display, LCD, is invented, the impossible mission of portable computer comes true. Since liquid crystal does not light itself, so there usually has a backlight device with backlighting function as the light source to achieve the purpose of displaying images on the LCD. In the present, LCD is used mainly on notebook, besides, it is also used on the monitors of small TV, video, PDA and cellular phone.

Traditional backlight device can be referred to the following R.O.C. patents: application No. 85100566, 88110209 and 84206661. Take FIG. 1 as example, the principle of backlight device is simply mentioned as below: firstly, the light source 2 inside the backlight device shoots the light to the reflecting slice 6 of the bottom of the photo conductive plate 4 which is previous to light. Then the reflecting slice 6 reflects the light to the diffusing film 8 which is on the bottom of the photo conductive plate 4 and above the reflecting slice 6. After that, the diffusing film 8 diffuses the light and then the diffused light penetrates the photo conductive plate 4 to inject to the LCD 10 which is above the photo conductive plate 4 with uniform brightness. The diffusing slice 12 between the photo conductive plate 4 and the LCD 10 is used to prevent the formation of image of the backlight device from being displayed on the LCD 10.

There are two kinds of light sources used for current backlight device: point light source and line light source. Point light source mostly lights by LED, and line light source mostly lights by cold cathode tube. Currently seen in the market of full color portable cellular phone, PDA use mostly cold cathode tube light source, which will easily produce top light source with uniform brightness, but the exhausting power is very huge. However, the exhausting power of the single color top light source which lights by LED is far smaller than the exhausting power of the line light source which lights by cold cathode tube, but the uniform brightness of the single color top light source is worse than the uniform brightness of line light source.

As a result, the principle of this invention is how to make backlight device of point light source using low exhausting power to produce top light source with uniform brightness.

SUMMARY OF THE INVENTION

The purpose of this invention is to provide a backlight device of low exhausting power's point light source which can produce top light source of uniform brightness, as to decrease the production cost and exhausting power rate of the backlight device.

This invention provides a backlight device which includes at least: a photo conductive plate used for visible light to go through; a point light source, which is beside the photo conductive plate, used for producing visible light; a first diffusing top, which is beside the photo conductive plate, used for diffusing the visible light from the point light source to the lighting method of uniform line light source; a second diffusing top, which is on the bottom of the photo conductive plate, used for diffusing the visible light from the first diffusing top to the lighting method of uniform top light source; a diffusing reflect objective, which is below the photo conductive plate, used for diffusing the light and then reflecting the diffused light to the photo conductive plate.

The backlight device mentioned above further includes a diffusing slice, which is above the photo conductive plate and below a LCD, is used to prevent the formation of image of the backlight device below the diffusing slice from being displayed on the LCD. The point light source includes using LED to light. The $1^{st}$ diffusing top and the $2^{nd}$ diffusing top are made up of diffusing material or micro-structure, wherein the $1^{st}$ diffusing top and the $2^{nd}$ diffusing top are used for light to transfer uniformly. The micro-structure shape of the $1^{st}$ diffusing top includes circle, ellipse or square. The micro-structure shape of the $2^{nd}$ diffusing top includes V shape or circle. Besides, there is an air gap between the photo conductive plate and the $1^{st}$ diffusing top, wherein the air gap is used for transferring the visible light of the point light source to the lighting method of line light source (or named as rectification action). Also, wherein the diffusing reflect objective includes the diffusing reflect slice or white color bottom frame. The location of the point light source is in front and below the photo conductive plate.

DESCRIPTION OF THE PREFERRED EMBODIMENT

The purpose of this invention is to provide a backlight device of low exhausting power's point light source which can produce top light source of uniform brightness, as to decrease the production cost and exhausting power rate of the backlight device.

Figure 1:
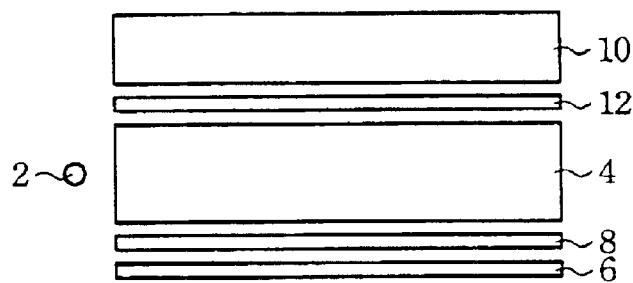
FIG. 1 is the structure map of backlight device according to an experienced example of traditional invention.
Figure 2A:
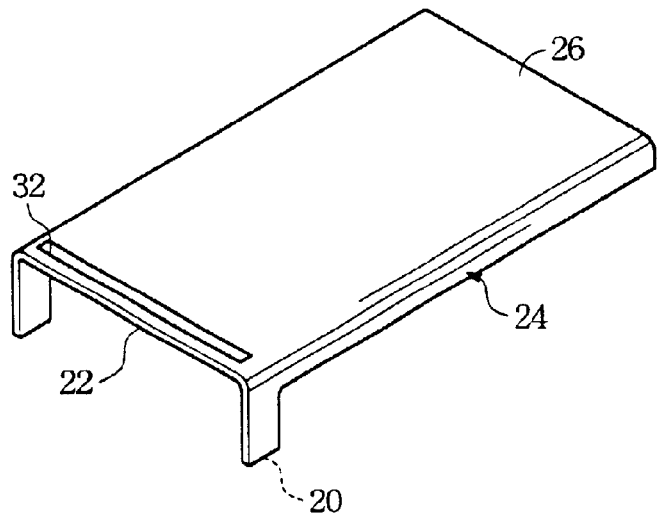
FIG. 2A is the structure map of backlight device according to an experienced example of this invention.

FIG. 2A shows the structure map of backlight device according to an experienced example of this invention. This structure map includes a photo conductive plate 26, a light source 20 beside the photo conductive plate 26, a $1^{st}$ diffusing top 22 beside the photo conductive plate 26 a $2^{nd}$ diffusing top 24 on the bottom of the photo conductive plate 26, a diffusing reflect slice below the photo conductive plate 26, a diffusing slice above the photo conductive plate 26 and below a LCD (not shown in the map). Also, an air gap 32 in the map is located between the photo conductive plate 26 and the $1^{st}$ diffusing top 22, wherein the air gap is used for transferring the point light source to line light source (or named as rectification action). The $1^{st}$ diffusing top 22 and the $2^{nd}$ diffusing top 24 can include micro-structure or are made up by diffusing materials (such as print).

In the experienced example of this invention, the light source includes the point light source using LED to light. The micro-structure shape of the $1^{st}$ diffusing top 22 includes circle, ellipse or square. The micro-structure shape of the $2^{nd}$ diffusing top 24 includes V shape or circle. And the micro-structure is used for light to transfer in uniform.

Figure 2B:
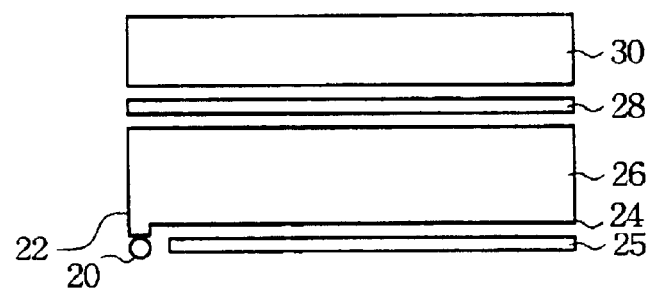
FIG. 2B is the structure sketch map of backlight device according to an experienced example of this invention.

FIG. 2B shows the structure sketch map of backlight device according to an experienced example of this invention. In the FIG. 2 B, after a light is shot by the point light source 20 and diffused by the 1$^{st}$ diffusing top 22, the light is transferred to the lighting method of uniform line light source, and then injected to the 2$^{nd}$ diffusing top 24 which is on the bottom of the photo conductive plate 26. After the light with uniform brightness of line light source lighting pattern is diffused by the 2$^{nd}$ diffusing top 24 and then reflected by the diffusing reflect objective 25, the light will be transferred to top light source lighting method with uniform brightness. Then the light with uniform brightness of top light source lighting pattern goes through the photo conductive plate 26 then injects to the LCD 30 above the photo conductive plate 26. The diffusing slice 28 between the photo conductive plate 26 and the LCD 30 is used to prevent the formation of image of the backlight device below the diffusing slice 28 from being displayed on the LCD 30.

Wherein the diffusing reflect objective 25 includes a diffusing reflect slice or a white color bottom frame. The point light source 20 is in front and below of both sides of the photo conductive plate 26.

As is understood by a person skilled in the art, the foregoing embodiments of the present invention are illustrated of the present invention rather than limiting of the present invention. It is intended to cover various modifications and similar arrangements included within the spirit and scope of the appended claims, the scope of which should be accorded the broadest interpretation in order to encompass all such modifications and similar structure.

What is claimed is:

1. A backlight device comprising:
   a) a photo conductive plate for a visible light to go through;
   at least one point light source, located beside a side of said photo conductive plate, for producing said visible light;
   b) a first diffusing top, located beside a wall of a side of said photo conductive plate and forming an air gap therebetween for diffusing the visible light from said at least one point light source to become a uniform line light source;
   c) a second diffusing top, on a bottom of said photo conductive plate, for diffusing the visible light from said line light source formed by said first diffusing top and said air gap to become a uniform top light source; and
   d) a diffusing reflect objective, below said photo conductive plate, for diffusing and reflecting the visible light out of said second diffusing top to said photo conductive plate.

2. The device according to claim 1, further comprising a diffusing slice, above said photo conductive plate and below a LCD to prevent the formation of image of said backlight device below said diffusing slice from being displayed on said LCD.

3. The device according to claim 1, wherein said at least one point light source comprises a LED.

4. The device according to claim 1, wherein said first diffusing top comprises a micro-structure to transfer the visible light uniformly.

5. The device according to claim 4, wherein the shape of said micro-structure is circular.

6. The device according to claim 4, wherein the shape of said micro-structure is elliptical.

7. The device according to claim 4, wherein the shape of said micro-structure is square.

8. The device according to claim 1, wherein said second diffusing top comprises a micro-structure used to transfer the visible light uniformly.

9. The device according to claim 8, wherein said micro-structure has a V shape.

10. The device according to claim 8, wherein the shape of said micro-structure is circular.

11. The device according to claim 1, wherein said first diffusing top is made of a diffusing material.

12. The device according to claim 1, wherein said 2$^{nd}$ diffusing top is made of a diffusing material.

13. The device according to claim 1, wherein said diffusing reflect objective comprises a diffusing reflect slice.

14. The device according to claim 1, wherein said diffusing reflect objective comprises a white bottom frame.

15. The device according to claim 1, wherein said side of said photo conductive plate has at least one foot, and said at least one point light source is located below said at least one foot of said photo conductive plate.

* * * * *